United States Patent
Boronka et al.

(10) Patent No.: US 10,644,574 B2
(45) Date of Patent: May 5, 2020

(54) OPTICAL SENSOR AND METHOD FOR ESTIMATING POSITIONS OF ROTORS IN A MOTOR AND THE MOTOR COMPRISING THE OPTICAL SENSOR

(71) Applicant: Robert Bosch GmbH, Stuttgart (DE)

(72) Inventors: Alexander Boronka, Shanghai (CN); Xiaoyun Zang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/324,828

(22) PCT Filed: Aug. 16, 2016

(86) PCT No.: PCT/CN2016/095509
§ 371 (c)(1),
(2) Date: Feb. 11, 2019

(87) PCT Pub. No.: WO2018/032352
PCT Pub. Date: Feb. 22, 2018

(65) Prior Publication Data
US 2019/0229589 A1 Jul. 25, 2019

(51) Int. Cl.
*H02K 11/22* (2016.01)
*H02P 6/16* (2016.01)
(Continued)

(52) U.S. Cl.
CPC ............ *H02K 11/22* (2016.01); *G01D 5/26* (2013.01); *G01D 5/34* (2013.01); *G01P 3/36* (2013.01); *H02P 6/16* (2013.01); *H02P 6/17* (2016.02)

(58) Field of Classification Search
CPC .. H02K 11/22; H02P 6/17; H02P 6/16; G01D 5/26; G01D 5/34
(Continued)

(56) References Cited

U.S. PATENT DOCUMENTS

| | | | |
|---|---|---|---|
| 4,707,650 A | * | 11/1987 | Bose ............... H02P 3/065 318/685 |
| 5,436,518 A | * | 7/1995 | Kawai ............. H02K 21/20 310/156.18 |

(Continued)

FOREIGN PATENT DOCUMENTS

| CN | 101860301 | 10/2010 |
|---|---|---|
| CN | 102055391 | 5/2011 |

(Continued)

OTHER PUBLICATIONS

International Search Report for Application No. PCT/CN2016/095509 dated Jun. 1, 2017 (2 pages).

*Primary Examiner* — Kawing Chan
(74) *Attorney, Agent, or Firm* — Michael Best & Friedrich LLP

(57) ABSTRACT

An optical sensor for estimating positions of rotors in a motor comprises an optical source (21) and a plurality of photo detectors (22), the motor further has stators and is used for e-machines, the optical source (21) is mounted on the surface of the rotor where the air gap is big enough to not block magnetic flux between the rotors and the stators, the photo detectors (22) are arranged evenly around the stator tooth slots and configured to detect light emitted by the optical source (21) and output parameters which are used to estimate the positions of rotors. The proposed low cost optical sensor measures the angular position of rotating e-machine when sensorless control algorithm is applied but limited by response time at high speed region. The optical sensor only adds small cost and provides rotor position information with enough accuracy for FOC control at high rotational speed. A method for estimating positions of rotors in a motor and a motor comprising the optical sensor are also provided.

9 Claims, 4 Drawing Sheets

(51) Int. Cl.
  *G01D 5/34* (2006.01)
  *H02P 6/17* (2016.01)
  *G01D 5/26* (2006.01)
  *G01P 3/36* (2006.01)

(58) Field of Classification Search
  USPC ........................................................ 318/490
  See application file for complete search history.

(56) References Cited

U.S. PATENT DOCUMENTS

| | | | |
|---|---|---|---|
| 6,049,187 A | 4/2000 | Haner | |
| 6,108,488 A * | 8/2000 | Haner | H02K 29/10 388/811 |
| 6,195,083 B1 * | 2/2001 | Salcudean | G05G 9/047 200/175 |
| 6,218,749 B1 * | 4/2001 | Nondahl | H02K 11/20 310/166 |
| 6,424,114 B1 * | 7/2002 | Komatsu | H02P 1/50 310/68 R |
| 7,166,984 B1 * | 1/2007 | Jones | H02K 17/12 310/254.1 |
| 7,459,824 B2 * | 12/2008 | Haner | H02K 23/66 310/179 |
| 7,834,495 B1 * | 11/2010 | Mitchell | H02K 16/00 310/46 |
| 2002/0101125 A1 * | 8/2002 | Ibuki | H02P 25/032 310/114 |
| 2006/0091756 A1 * | 5/2006 | Haner | H02K 23/66 310/180 |
| 2007/0252551 A1 * | 11/2007 | Clothier | H02P 25/0925 318/705 |
| 2007/0278983 A1 * | 12/2007 | Clothier | H02P 25/092 318/701 |
| 2009/0091303 A1 * | 4/2009 | Schweitzer, III | G01D 5/3473 322/99 |
| 2009/0091316 A1 * | 4/2009 | Santos | G01D 5/142 324/207.25 |
| 2010/0007303 A1 * | 1/2010 | Chetelat | B64G 1/28 318/689 |
| 2010/0052451 A1 * | 3/2010 | Lee | H02K 1/16 310/113 |
| 2010/0134053 A1 * | 6/2010 | Yamada | H02M 7/53875 318/162 |
| 2010/0181956 A1 * | 7/2010 | Sasaki | G01P 3/481 318/653 |
| 2014/0184002 A1 * | 7/2014 | Levin | H02K 41/06 310/90 |
| 2018/0159455 A1 * | 6/2018 | Pietromonaco | H02K 11/21 |
| 2019/0229589 A1 * | 7/2019 | Boronka | G01D 5/26 |

FOREIGN PATENT DOCUMENTS

| | | |
|---|---|---|
| CN | 103337993 | 10/2013 |
| CN | 103444053 | 12/2013 |
| CN | 104283469 | 1/2015 |
| DE | 19922009 | 11/2000 |
| DE | 102011108382 A1 | 1/2013 |
| WO | 2013092369 | 6/2013 |

* cited by examiner

OPTICAL SENSOR AND METHOD FOR ESTIMATING POSITIONS OF ROTORS IN A MOTOR AND THE MOTOR COMPRISING THE OPTICAL SENSOR

BACKGROUND OF THE INVENTION

The present invention relates to rotor position estimation, and more particularly, to optical sensor and method for estimating positions of rotors in a motor and to the motor comprising the optical sensor.

To drive a permanent magnet synchronous motor (PMSM), the rotor position is needed to allow field oriented control (FOC). A rotor position sensor such as resolver, hall sensor, GMR sensor, or optical encoder can provide the rotor position information, but it is usually costly.

There have been a lot of researches on sensorless control topic which have intended to use the 3-phase current information to extract the rotor position information and therefore to relieve the system from rotor position or angular position sensors so that total cost is reduced and system reliability is improved.

Specifically, in a situation without rotor position sensor, the rotor position can be estimated by extracting the position information from the measured phase currents. Typical extraction methods include non-linear observer method, or sliding-mode observer method.

However, most of the methods involve low-pass filter and there are delay times involved. When the rotational speed is very high (typically more than 6000 rpm), the delay time will be comparable to the electrical rotational cycle. The deficiencies of the conventional techniques may be clearly understood from FIG. 1, which shows the delay time between actual speed $\omega_m$ and expected speed $\hat{\omega}_m$ from the test result when sensorless control is applied. In this case the sensorless control algorithm has limit to extract the rotor position information in the rotational cycle when the speed is up to a level of more than 6000 rpm typically for a pole pair of 4 and the limit level would be lower if pole pair is bigger.

Prior art researches or inventions have addressed the problems when the e-machine is at standstill or at low speed when the sensorless control strategy has few limits or accuracy issues, but no prior arts have taken high speed issues into consideration.

SUMMARY OF THE INVENTION

As mentioned above, with the wider and wider application of the sensorless control algorithm in e-scooters and even in electrical vehicles, there comes the response time limit of sensorless control algorithm due to its inherent filters. Therefore, due to the deficiencies of the conventional sensorless control techniques, there is a need to provide an improved method and sensor for addressing this issue with low cost solution at high speed regions.

To this end, the inventors of the present invention found that at high speed regions as the revolutions are fast and it is not required to be high accuracy of the angular position, there is a need to design a low cost angular position sensor with rough accuracy.

Therefore, in accordance with an aspect of the present invention, it proposes an optical sensor for estimating positions of rotors in a motor, which further has stators and is used for e-machines. The optical sensor comprises an optical source mounted on the surface of one rotor where the air gap is big enough to not block magnetic flux between the rotors and the stators; and a plurality of photo detectors arranged evenly around the stator tooth slots and configured to detect light emitted by the optical source and output parameters which are used to estimate the positions of rotors.

Furthermore, in accordance with another aspect of the present invention, it proposes a method for estimating positions of rotors by utilizing the sensorless control algorithm and the optical sensor together.

In one embodiment, it proposes a method for estimating positions of rotors in a motor, the motor further having stators and being used for e-machines, the motor comprising the optical sensor mentioned above, the method comprising:

estimating the rotational speed n of the motor;

determining whether the rotational speed n exceeds a predetermined speed $n_{sw}$; and estimating the positions of rotors based on the measured phase currents if the result of determination is NO, and estimating the positions of rotors based on the parameters output by the plurality of photo detectors if the result of determination is YES.

In this way, the proposed low cost optical sensor measures the angular position of rotating e-machine when sensorless control algorithm is applied but limited by response time at high speed region. The optical sensor only adds small cost and provides rotor position information with enough accuracy for FOC control at high rotational speed.

In another embodiment, it proposes a method for estimating positions of rotors in a motor, the motor further having stators and being used for e-machines, the motor comprising the optical sensor mentioned above, the method comprising:

(a) estimating the positions of rotors based on the measured phase currents;
(b) estimating the rotational speed n of the motor;
(c) determining whether the rotational speed n exceeds a predetermined speed $n_{sw}$ plus a hysteresis speed $n_{hyst}$;
(d1) going back to step (a) if the result of determination is NO, and (d2) estimating the positions of rotors based on the parameters output by the plurality of photo detectors if the result of determination is YES;
(e) estimating the rotational speed n of the motor;
(f) determining whether the rotational speed n is lower than the predetermined speed $n_{sw}$ minus the hysteresis speed $n_{hyst}$; and
(g1) going back to step (d2) if the result of determination is NO, and (g2) going back to step (a) if the result of determination is YES.

Compared with the first method, the second method provides a smooth switch-over between sensorless control and control with optical sensor, which is typically a hysteresis to avoid frequent switch between the two control modes at the critical speed.

Furthermore, in accordance with another aspect of the present invention, it proposes a motor comprising the optical sensor for estimating positions of rotors, and an e-machine comprising the motor.

Various aspects and features of the disclosure are described in further detail below. These and other aspects of the invention will be apparent from and elucidated with reference to the embodiment(s) described hereinafter.

BRIEF DESCRIPTION OF THE DRAWINGS

The present invention will be described and explained hereinafter in more detail in combination with embodiments and with reference to the drawings, wherein.

Figure 1:
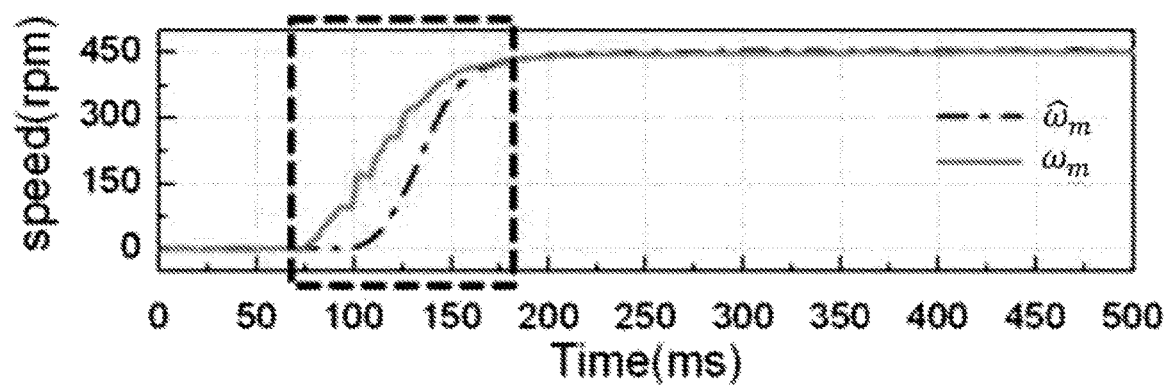
FIG. 1 shows the delay time between actual speed and expected speed from the test result when sensorless control is applied.

The same reference signs in the figures indicate similar or corresponding feature and/or functionality.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

As mentioned above, an optical sensor is proposed as a low cost rotor position sensor solution and is used only at high speed region.

Figure 2:
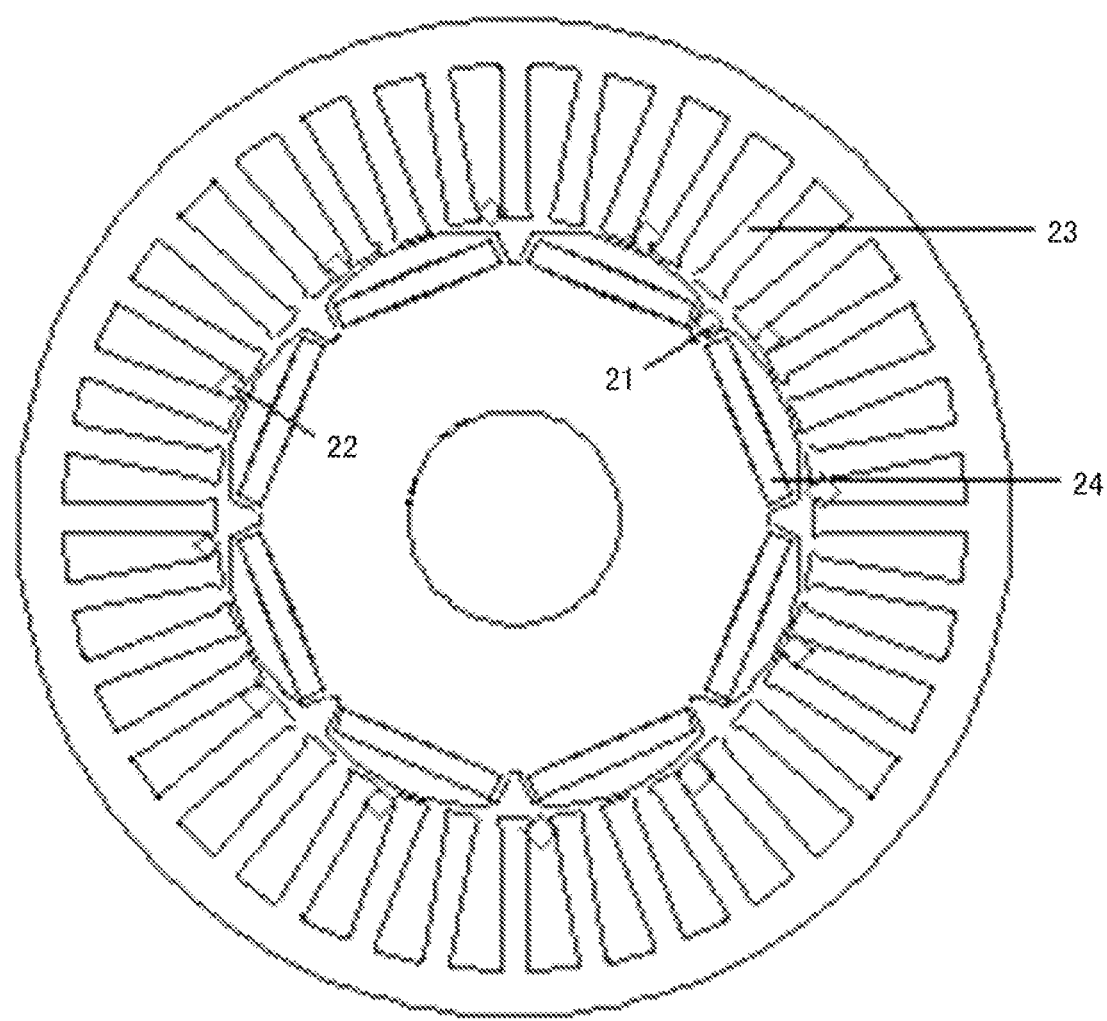
FIG. 2 is a schematic view of placement of the optical sensor according to one embodiment of the present application.

FIG. 2 shows the placement of the optical sensor. As shown, the optical sensor consists of an optical source 21 and a few photo detectors 22 displaced evenly within the slots between the stator teeth 23. The optical source 21 can be mounted on the rotor surface where the air gap is relatively big not to block magnetic flux between rotor and stator.

The optical source 21 can be powered by an external power supply either wired or wireless. If the power supply is wired, the wiring has to be placed along the rotor shaft so that it will not be wound during the rotations. If the power supply is wireless, the energy transmitter could be radio waves, microwaves, infrared or visible light waves et al. Energy transmitter such as electric fields, magnetic fields shall be taken special precautions to avoid EMC issues.

In one embodiment, LED is utilized as the optical source 21. The LED is insensitive to the EMI generated by the rotor magnets 24 and can be placed within or very near the electromagnet 24 of the rotor. Further, the optical sensor possesses characteristics of long term stability and high resolution.

In one embodiment, the number of the photo detectors 22 can be N*3*p, where p is the number of rotor pole pair, N can be any natural number. The more N is, the better accuracy the optical sensor has. If N is 1, then the accuracy of the electrical rotor position is 120°. If N is 2, then the accuracy of the electrical rotor position is 60°, and so on. The photo detectors 22 can be evenly placed on the top of the stator winding (with insulations in between) inside each of the tooth slots. The reason of placing the photodetectors inside the slots is, firstly not to reshape the air gap flux. Secondly the stator teeth crown which partially blocks the LED light beam happens to be at a place between the LED and photo detector. As viewed by the photo detector the space between the teeth clowns appears to be a slit. Therefore it is possible for the photo detector to detect the position of the LED as well as the rotor position when the rotor turns to the place where the LED and the photo detector face one another, the maximal light energy reaches the photo detector and their axes are aligned.

The optical sensor with the LED/photodetector pair provides the absolute rotor positions at the positions where the photo detector is placed. The rotor position inbetween the photodetectors can be calculated from $\theta_0 + \omega t$, $\theta_0$ is the position read from the photodetector, and $\omega$ is the estimated speed from the different photodetector readings. The estimated rotor position is then refreshed once the rotor turns and aligns to the next photodetector.

This optical sensor shall only be used at high speed operations because at high speed region, $\omega$ is high and the estimation time is small so that accumulated error would be small than that at low speed regions. This is the theoretical background of why the optical sensor shall be used at high speed and sensorless control algorithm at low and middle speed operations.

In accordance with another aspect of the present invention, it proposes a method for estimating positions of rotors by utilizing the sensorless control algorithm and the optical sensor together. In other words, it proposes a combined control strategy with sensorless control and with optical sensor.

When the motor starts to operate, the rotational speed n of the motor could be monitored and estimated continuously in accordance with any method well-known in the prior art.

Then, the rotational speed n is compared with a predetermined speed $n_{sw}$, which is the mode switching speed and typically 6000 rpm. Usually, at this time, since the motor just starts and operates in a low or middle speed region, the rotational speed n is lower than the predetermined speed $n_{sw}$. In this case, the control strategy utilizes the sensorless control and the positions of rotors are estimated based on the measured phase currents.

When the rotational speed n increases as time goes by and exceeds the predetermined speed $n_{sw}$, the control strategy would change to the control with optical sensor. In other words, in this case, the positions of rotors are estimated based on the parameters output by the plurality of photo detectors.

In this way, the proposed low cost optical sensor measures the angular position of rotating e-machine when sensorless control algorithm is applied but limited by response time at high speed region. The optical sensor only adds small cost and provides rotor position information with enough accuracy for FOC control at high rotational speed.

In another embodiment, it further proposes an improved combined control strategy. The improved combined control strategy with sensorless control and with optical sensor is shown in FIG. 3.

Figure 3:
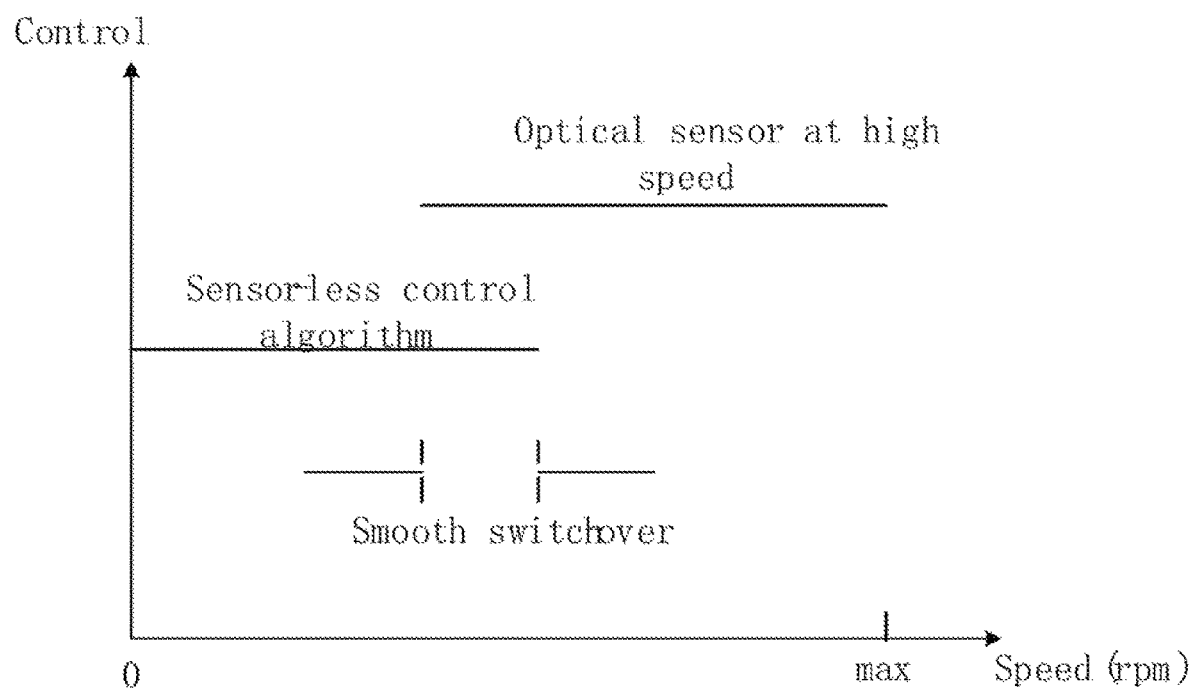
FIG. 3 shows the improved combined control strategy with sensorless control and with optical sensor.

As shown in FIG. 3, there is a smooth switch-over between sensorless control and control with optical sensor, which is typically a hysteresis to avoid frequent switch between the two control modes at the critical speed. When the control mode is sensorless control and the speed is higher than $n_{sw} + n_{hyst}$, the rotor position starts to use $\hat{\theta} + \omega t$ until the first photodetector detects the LED energy and outputs the absolute rotor position $\theta$. $\hat{\theta}$ is the last estimated rotor position from sensorless control strategy. When the control mode is now with optical sensor and the speed is now lower than $n_{sw} - n_{hyst}$, the control mode is switched to sensorless control. $n_{sw}$ is the mode switching speed and typically 6000 rpm, and $n_{hyst}$ is the hysteresis speed typically 60 rpm.

Figure 4:
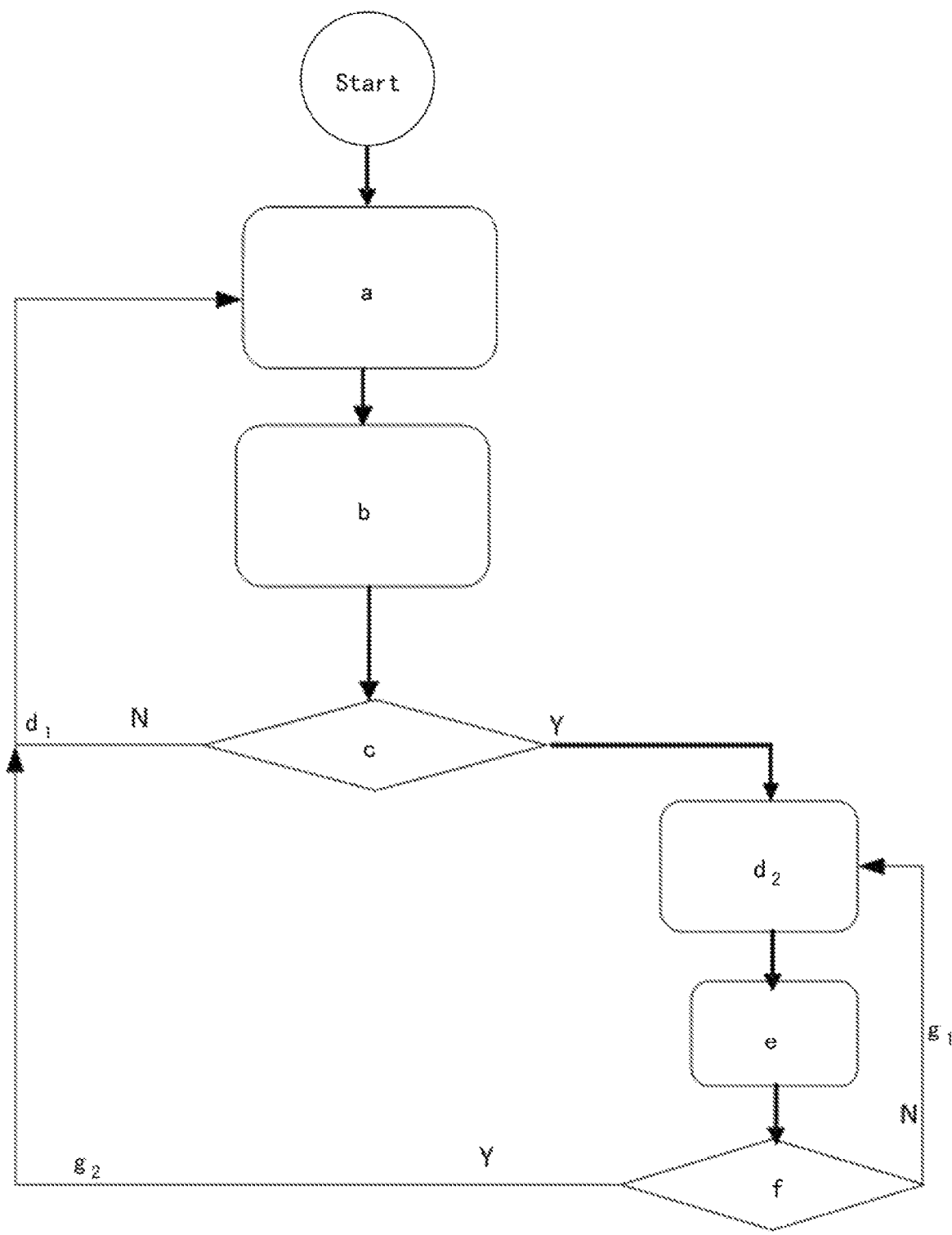
FIG. 4 is a flow chart of the method for estimating positions of rotors according to an embodiment of the present invention.

FIG. 4 is a flow chart of the method for estimating positions of rotors according to an embodiment of the present invention, which is running throughout the torque control or speed control mode for e-scooter or electrical vehicle applications.

As shown in FIG. 4, at step a, usually when the motor starts to operate, since the motor just starts and operates in a low or middle speed region, the control strategy utilizes the sensorless control, and the positions of rotors are estimated based on the measured phase currents.

Next, at step b, the rotational speed n of the motor is estimated. Then, at step c, the estimated speed n is compared with a predetermined speed $n_{sw}$ plus a hysteresis speed $n_{hyst}$, and it is determined whether the rotational speed n exceeds the sum. Then, see step d1, if the result of determination is NO, the flowchart would go back to step a. However, see step d2, if the result of determination is YES, the control strategy would change to the control with optical sensor, and the positions of rotors would then be estimated based on the parameters output by the plurality of photo detectors. In other words, if the rotational speed n exceeds a predetermined speed $n_{sw}$ plus a hysteresis speed $n_{hyst}$, the control strategy would change from the sensorless control to the control with optical sensor.

At step e, the rotational speed n of the motor is estimated again. Then, at step f, the estimated speed n is compared with the predetermined speed $n_{sw}$ minus the hysteresis speed $n_{hyst}$, and it is determined whether the rotational speed n is lower than $n_{sw}-n_{hyst}$. Then, see step g1, if the result of determination is NO, the flowchart would go back to step d2. However, see step g2, if the result of determination is YES, the flowchart would go back to step a, and the positions of rotors would then be estimated based on the measured phase currents. In other words, if the rotational speed n is lower than the predetermined speed $n_{sw}$ minus the hysteresis speed $n_{hyst}$, the control strategy would change back to the sensorless control and the positions of rotors are estimated based on the measured phase currents.

Compared with the first method, the second method provides a smooth switch-over between sensorless control and control with optical sensor, which is typically a hysteresis to avoid frequent switch between the two control modes at the critical speed.

According to a further aspect of the present application, the above proposed optical sensor may be incorporated in a motor. In this way, the positions of rotors in the motor may be estimated based on any one of the above mentioned two methods. Furthermore, the e-machine in the prior art may comprise the motor with the optical sensor to make advantage of the novel rotor position estimation approach.

Please note that, the steps of the methods shown in the present invention should not be limited to the steps mentioned above. It will be apparent to those skilled in the art that the various aspects of the invention claimed may be practiced in other examples that depart from these specific details.

Furthermore, as can be easily understood by the skilled in the art, in the apparatus claim enumerating several means, several of these means can be embodied by one and the same item of hardware. The mere fact that certain measures are recited in mutually different dependent claims does not indicate that a combination of these measures cannot be used to advantage.

It should be noted that the above-mentioned embodiments illustrate rather than limit the invention and that those skilled in the art would be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the system claims enumerating several units, several of these units can be embodied by one and the same item of software and/or hardware. The usage of the words first, second and third, et cetera, does not indicate any ordering. These words are to be interpreted as names.

The invention claimed is:

1. An optical sensor for estimating the position of a rotor in a motor, the motor further having a stator and being used for electric machines, the stator having stator tooth slots, and the optical sensor comprising: an optical source mounted on a surface of the rotor where an aft gap is big enough to not block magnetic flux between the rotor and the stator; and a plurality of photo detectors arranged inside respective stator tooth slots and evenly distributed around the circumference of the stator and configured to detect light emitted by the optical source and output parameters which are used to estimate the position of the rotor.

2. The optical sensor according to claim 1, wherein the number of the photo detectors is N*3*p, where p is the number of rotor pole pairs and N is any natural number.

3. The optical sensor according to claim 1, wherein the optical source is LED and is powered by an external power supply.

4. A method for estimating the position of a rotor in a motor, the motor further having a stator and being used for e-machines, the motor comprising the optical sensor according to claim 1, the method comprising:
  estimating the rotational speed n of the motor;
  determining whether the rotational speed n exceeds a predetermined speed $n_{sw}$; and
  estimating the position of the rotor based on measured phase currents if the result of the determining step is NO, and estimating the position of the rotor based on parameters output by the plurality of photo detectors if the result of the determining step is YES.

5. The method according to claim 4, wherein
  the parameters output by the plurality of photo detectors comprise the maximum light energy output by one of the photo detectors when said one of the photo detectors and the optical source face one another and axes of said one of the photo detectors and the optical source are aligned, and
  wherein estimating the position of the rotor based on the parameters output by the plurality of photo detectors comprises:
  taking the position $\theta_0$ of said one of the photo detectors as the position of the rotor when said one of the photo detectors outputs the maximum light energy;
  estimating the position of the rotor between said one of the photo detectors and another photo detector next to said one of the photo detectors from $\theta_0+\omega t$, wherein $\omega$ is the estimated rotational speed of the motor; and
  taking the positon of said another photo detector as the position of the rotor when said another photo detector outputs the maximum light energy.

6. A method for estimating the position of a rotor in a motor, the motor further having a stator and being used for electric machines, the motor comprising the optical sensor according to claim 1, the method comprising: (a) estimating the position of the rotor based on measured phase currents; (b) estimating the rotational speed n of the motor; (c) determining whether the rotational speed n exceeds a predetermined speed $n_{sw}$ plus a hysteresis speed $n_{hyst}$; (d1) going back to step (a) if the result of step (c) is NO, and (d2) estimating the position of the rotor based on the parameters output by the plurality of photo detectors if the result of step (c) is YES; (e) estimating the rotational speed n of the motor; (f) determining whether the rotational speed n is lower than the predetermined speed $n_{sw}$ minus the hysteresis speed $n_{hyst}$; and (g1) going back to step (d2) if the result of step (f) is NO, and (g2) going back to step (a) if the result of step (f) is YES.

7. The method according to claim 6, wherein the parameters output by the plurality of photo detectors comprise the maximum light energy output by one of the photo detectors when said one of the photo detectors and the optical source face one another and axes of said one of the photo detectors and the optical source are aligned, and wherein estimating the positions of rotors based on the parameters output by the plurality of photo detectors comprises:

taking the position $\theta_0$ of said one of the photo detectors as the position of the rotor when said one of the photo detectors outputs the maximum light energy;

estimating the position of the rotor between said one of the photo detectors and another photo detector next to said one of the photo detectors from $\theta_0+\omega t$, wherein $\omega$ is the estimated rotational speed of the motor; and taking the positon of said another photo detector as the position of the rotor when said another photo detector outputs the maximum light energy.

8. A motor comprising a rotor and a stator and being used for electric machines, the motor further comprising the optical sensor according to claim 1, wherein the positions of rotors are estimated by: estimating the rotational speed n of the motor; determining whether the rotational speed n exceeds a predetermined speed $n_{sw}$; and estimating the position of the rotor based on measured phase currents if the result of the determining is NO, and estimating the position of the rotor based on parameters output by the plurality of photo detectors if the result of the determining is YES.

9. An electric machine comprising the motor according to claim 8.

* * * * *